Figure 1:
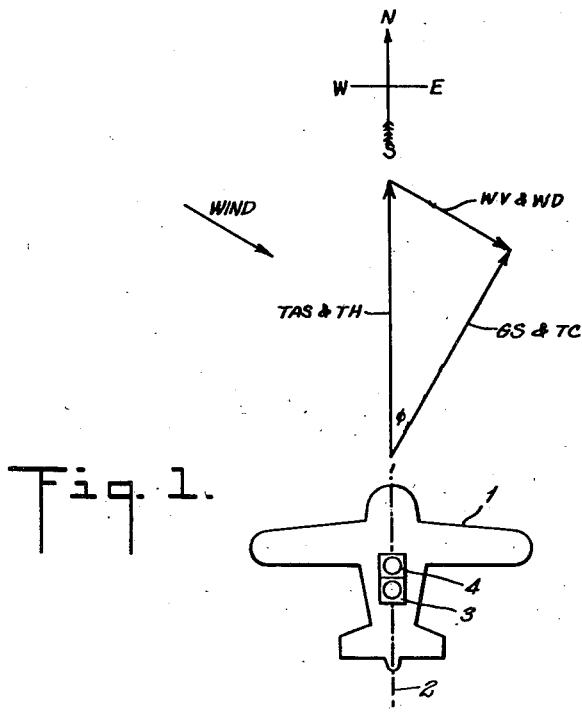

Aug. 28, 1951 — D. SKALKA — 2,565,745
NAVIGATIONAL AID DEVICE
Filed Nov. 24, 1948 — 4 Sheets-Sheet 1

INVENTOR.
DAVID SKALKA
BY
ATTORNEYS

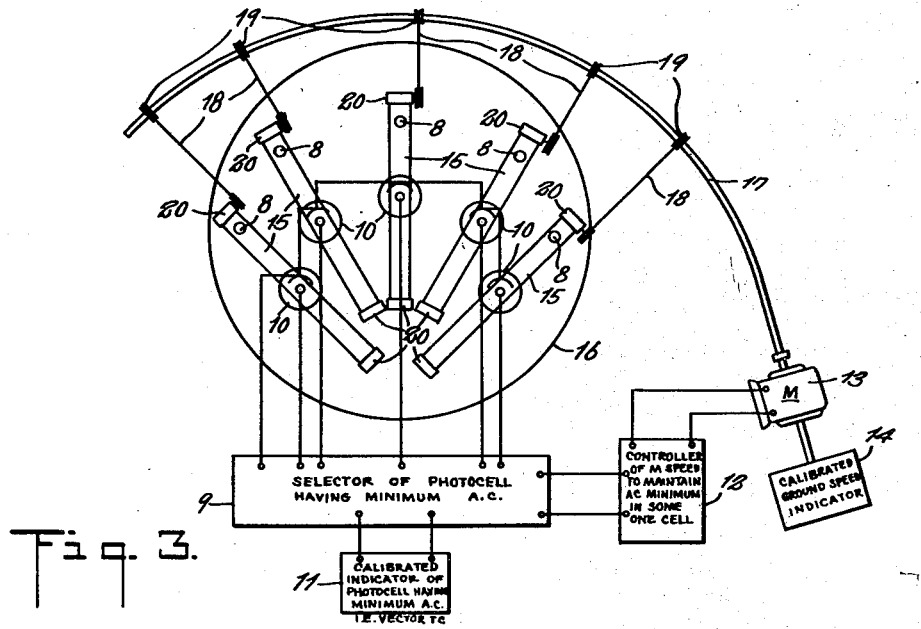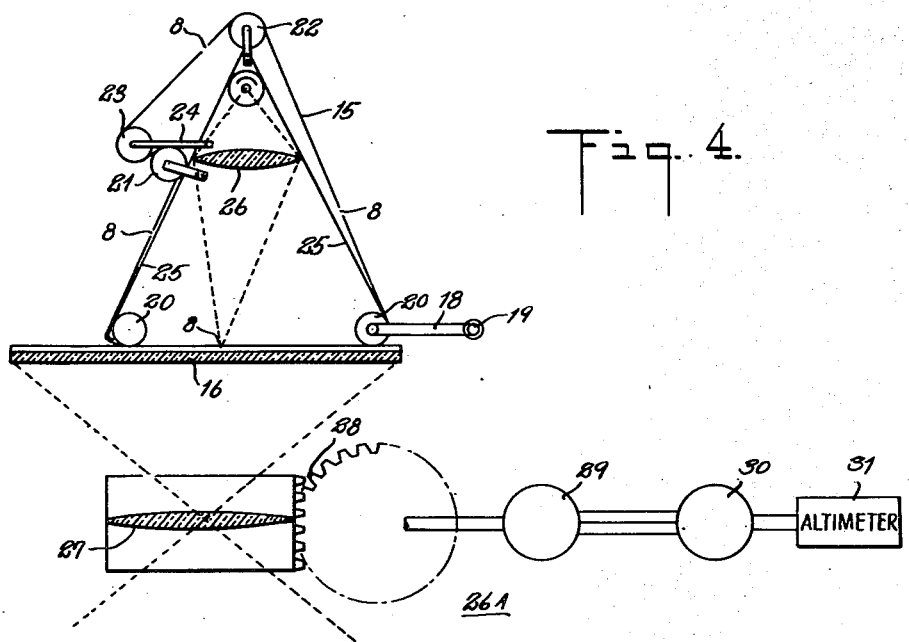

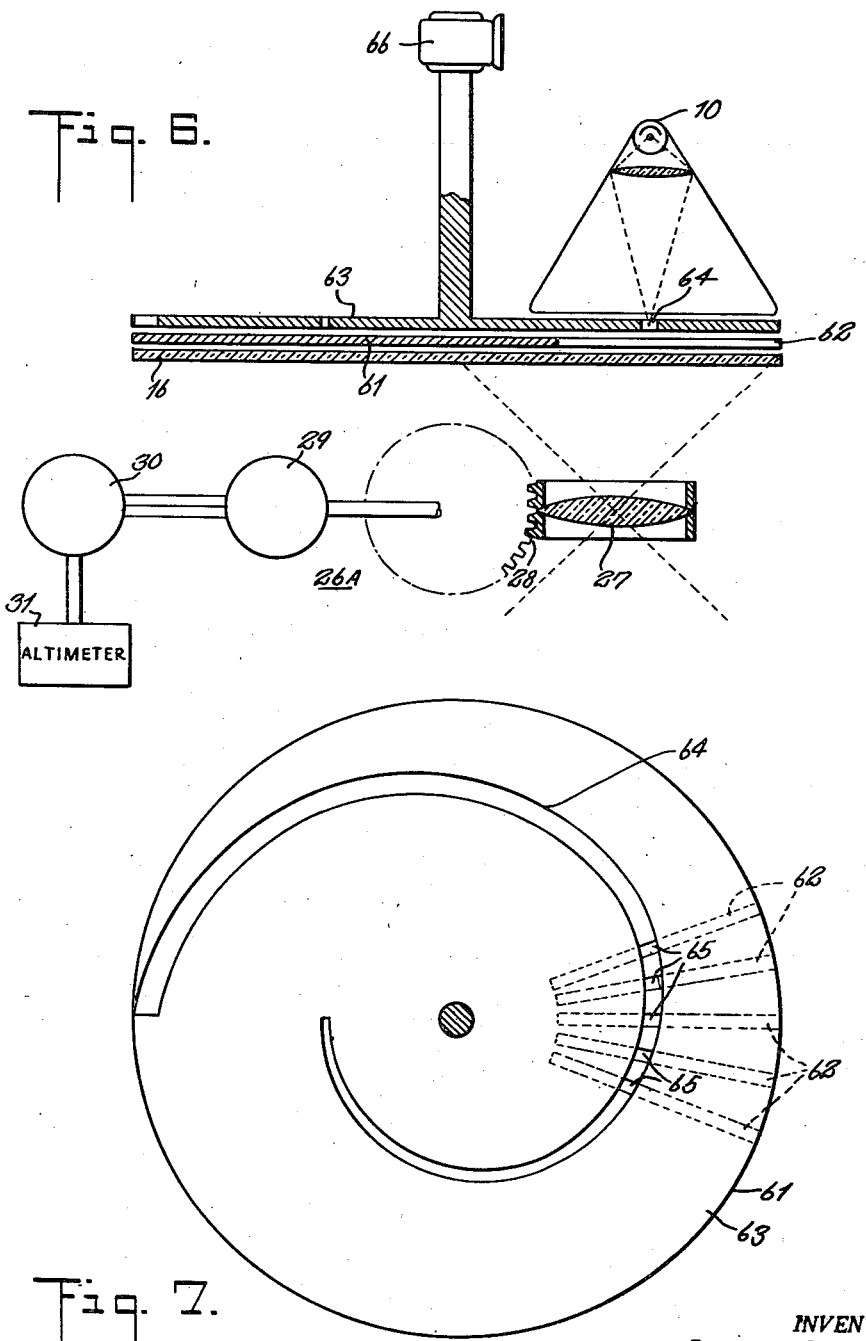

Patented Aug. 28, 1951

2,565,745

UNITED STATES PATENT OFFICE 2,565,745

NAVIGATIONAL AID DEVICE

David Skalka, New York, N. Y.

Application November 24, 1948, Serial No. 61,820

20 Claims. (Cl. 33—46.5)

While this invention may be considered as applicable to many problems involving the measurement of the parameters of relative motion between objects or the performance of control functions governed by such parameters, it finds particularly advantageous application in the field of aircraft navigation and contemplates particularly the provision of mechanisms for indicating, preferably continuously and automatically, the speed and direction of an aircraft or like device relative to the ground over which it is in flight—and this with or without the use of mechanisms controlling the flight in response to the indicated speed or direction.

As is well known in the aircraft navigation and related arts, it is often necessary to determine speed and direction of the craft relative to the ground as well as the air. Where, as is usually the case, the air is in relative motion with respect to the ground, the two relations are not identical. The true speed with respect to the ground may be more or less than the speed through the air depending upon whether the wind is aiding or opposing flight. At the same time, where the air is moving in a direction having a component across the intended direction of flight, the actual direction of the craft's flight will be caused to drift away from the intended direction for which reason the directions of speed relative to the air and ground will be angularly disposed with respect to each other by an angle which is generally termed the "drift angle."

Numerous devices for the measurement of the ground speed or the "drift angle" are known to the prior art; however, to my knowledge, none of these have provided continuously functioning mechanisms which automatically regulate themselves to the speed and direction of flight at all times so that they may operate to provide instantaneous indications which might be used, for example, to provide a continuous record of the various parameters or which may be used as control factors governing regulatory mechanisms controlling navigation equipment such as automatic pilot or other devices.

Accordingly, it is the general object of my invention to provide a new and improved means for measuring and indicating air speed and ground speed both as respects magnitude and angular relations.

It is a further object of the invention to provide such a device which automatically regulates itself to the speed and direction of flight at all times whereby continuous indications of the necessary data are provided.

Figure 2:
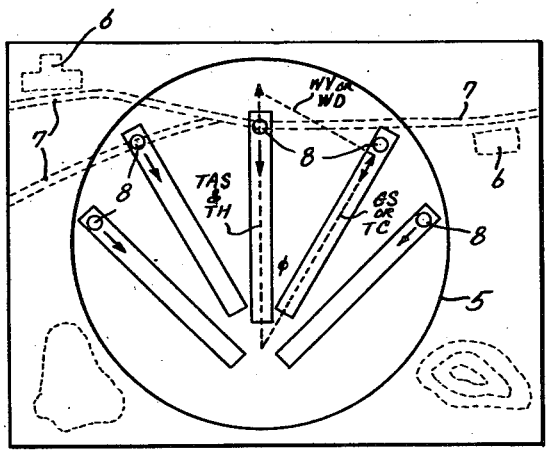
Figure 5:
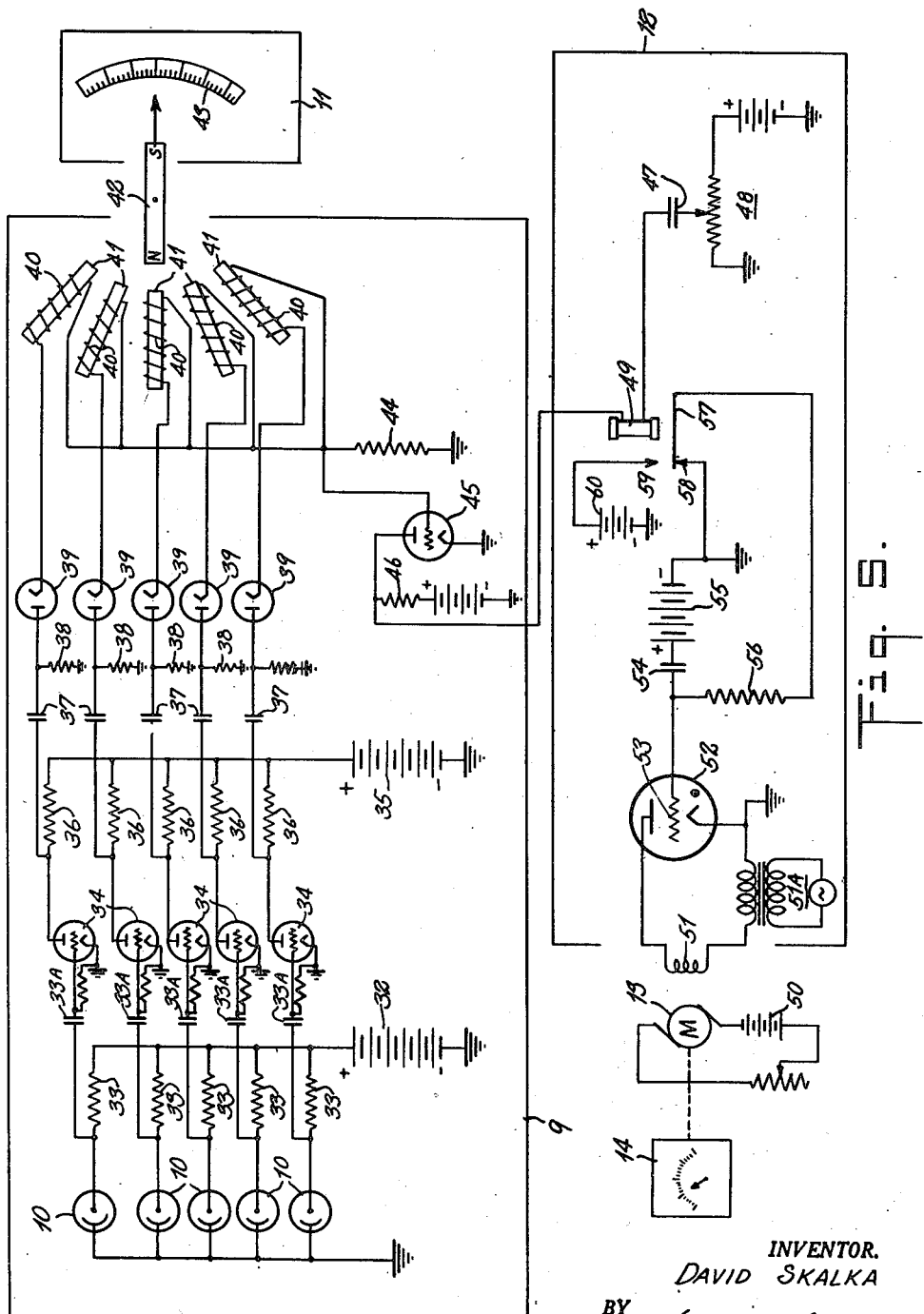

The features of the invention upon which patent protection is sought are set forth in the appended claims. The invention itself together with further objects thereof and its advantages will best be understood by reference to the following specification when taken in connection with the accompanying drawings in which:

The Fig. 1 is a schematic drawing employed to illustrate the general problems of navigation with which the invention is concerned;

The Fig. 2 is a schematic drawing illustrating the essential principles of the invention and their application to the problems illustrated by the Fig. 1;

The Fig. 3 is a schematic illustration of a composite control apparatus as applied to a mechanism constructed in accordance to the principles of the Fig. 2;

The Fig. 4 is a vertical view through one of the moving tape mechanisms of the Fig. 3 employed to illustrate the mechanics thereof;

The Fig. 5 illustrates the details of the control circuits indicated only schematically in the Fig. 3;

While the Figs. 6 and 7 illustrate alternative mechanisms for implementing the principles of the Figs. 2 and 3 and which are suggested as alternatives to the particular mechanical embodiment of the Fig. 3.

Throughout the figures like numerals have been used to designate like or identical parts.

Referring now to the Fig. 1 illustrating a typical navigational problem for aircraft, the aircraft I is for convenience of illustration, assumed to be flying in the intended or true direction North, i. e., with its longitudinal axis 2 directed true North, as would normally be determined from the plane's compass. The vector TH (true heading) indicates that true direction while its length is a measure of the true air speed (TAS). Again, for convenience, assume that the air through which the plane is flying, is being carried by the wind in a direction indicated by the left hand arrow. It will be understood then that the plane's actual course will be caused to "drift" by a component having a somewhat southeasterly direction at the velocity of and with the direction of the wind. This drift component of the plane's motion may be presented by the vector WD (wind direction) the length of which is a measure of the wind velocity (WV). As will be quite apparent to those skilled in the art, the resultant actual direction of the motion of the plane with respect to the ground may be represented by the resultant vector TC (true course)

the length of which is a measure of the true speed with respect to the ground (GS). The angle of separation between the vector TC and the vector TH is commonly known as the drift angle $\phi$.

In situations such as just outlined, it is desirable to have a measure of both the ground speed (GS) and its relative direction, i. e., drift angle $\phi$. The prior art discloses several devices for measuring these factors independently. For example, drift angle measurement may be accomplished by aligning elongated viewing apertures with the apparent direction of motion of objects on the ground and comparing the direction of alignment with the direction in which the plane's longitudinal axis is directed (cf. U. S. Letters Patent 2,363,600—Lawlor); while the magnitude of ground speed may be measured by synchronizing the speed of motion of a moving viewing aperture within the plane with the apparent speed of motion of objects on the ground (cf. U. S. Letters Patent 1,385,776—Chamberlain). In these cases, as with my present invention, the observations of the ground are made simply by some sort of an optical system 3 which provides a view from the bottom of the plane of the ground pattern below. For purposes of comparison, a compass 4 may be positioned adjacent system 3. It will also be understood that the system is suitably stabilized as by gyroscopic means.

These prior art devices are however lacking in any means for simultaneously indicating both the drift angle and the ground speed and particularly lacking in any mechanism which will automatically and continuously follow the changes in these parameters. Such means are provided by my invention by use of the principle illustrated broadly by the Fig. 2, which I shall now proceed to describe.

In connection with the Fig. 2, it is assumed that some sort of an optical system may be provided which will afford an image of the terrain beneath the plane and over which it is passing, and that the field of vision of such an optical system might be that indicated within the circle 5. It will be noted that the ground pattern (of buildings 6 and roads 7, etc.) indicated by the dotted lines will have some portion thereof falling within the field of view represented by the circle 5. It may be assumed that in a manner analogous to that illustrated by the Fig. 1 the plane carrying the optical system will be traveling over the terrain in some sort of speed-direction relationship such as that indicated by the vectors TC and TH, separated by the angle $\phi$ as before. Assume now that the system is so constructed as to provide a suitable plurality of viewing apertures 8 or "eyes" all continuously moving at different angles to the longitudinal axis of and toward the rear of the plane, i. e., generally with a component in the direction of the apparent motion of objects on the ground. Such a mechanism may be constructed in a plurality of ways two of which I shall illustrate hereinafter. If a suitable plurality of these aperture mechanisms be provided, it will be the general case that at least one of them will, at least approximately, align itself in respect of its direction of motion with the direction of apparent motion of objects on the ground. If one of them is not exactly so aligned, then it will be possible to interpolate as between the two adjacent ones which are most closely aligned.

Now, as will be apparent from the geometry of the Figs. 1 and 2, that aperture 8, the motion of which is assumed to be in direction alignment with the apparent ground motion, may also be so adjusted in respect to its speed of motion toward the rear of the plane that the aperture will overlap or encompass within its field of view some selected fixed portion of the ground image at all points of the aperture's motion, which means that the light intensity transmitted through the aperture will be substantially constant for the entire length of its travel. On the other hand, because of their different alignments of their various directions of motion with respect to apparent ground motion, none of the other apertures will be able to encompass in this manner a single such portion of the ground image and maintain it within the field of view of the corresponding aperture, which means that for all of the remaining apertures, there will be a considerable fluctuation of the light transmitted through those apertures as they travel along their paths of motion. It is preferable and convenient, although not essential, that the speed of motion of all of the plurality of apertures be the same, and it may be assumed that means to that end may be provided.

With the foregoing situation, it will be apparent that one may determine and indicate the direction of the vector TC by simply selecting the aperture which has its motion in alignment with the apparent motion of ground objects; while at the same time if one adjusts the speed of travel of the various apertures until the selected one moves in apparent synchronism with the objects on the ground, he may directly relate the true ground speed to the known speed of travel of the aperture.

As a next step in the evolution of an illustrative apparatus utilizing the principles of my invention, there may be provided means for automatically selecting and indicating which of the plurality of apertures 8 has attained synchronism of motion with respect to the ground objects both as respects the speed and direction; as well as means for automatically regulating the system to attain and maintain such synchronism. Further, the system may include mechanisms arranged to operate suitable dial indicators or other calibrated means which furnish a direct visual indication of drift angle and speed to the pilot, or other mechanisms arranged to furnish such information to automatic pilot devices for controlling the same. All of these means and mechanisms may be arranged to control and vary the speed of travel of the apertures to make them conform to changing apparent motions of the objects on the ground as the plane's speed or course changes.

Means to these ends are schematically indicated in the composite illustration of the Fig. 3. Broadly speaking the basic principle of selection here utilized in a selector 9 may be illustrated by the circuit which I shall later describe in more detail in connection with Fig. 4 and which may comprise, in general, a multiple rectifying circuit operating in conjunction with a plurality of photoelectric cells 10 each associated with one of the moving apertures 8 and positioned to be energized by the portion of the ground image passing through its associated aperture at all points of the aperture's travel. The rectifying circuit may be so arranged that the fluctuating components of the photoelectric currents induced in each photoelectric-cell are rectified. If the circuit be also so arranged that it will indicate on an indicator 11 the photoelectric-cell which has the minimum rectified current (i. e., minimum fluctuating current component or minimum light fluctuation) that latter photoelectric-cell will correspond to that moving aperture which is aligned and synchronized with the true ground speed. This is because only the particular aperture which has been aligned and synchronized with the apparent ground motion will have a constant or substantially constant amount of light coming through it for the reasons already indicated. While it may be only ideally true that only one of the plurality of apertures may be thus aligned, nevertheless, even if the vector TC should fall between two apertures rather than on a single one, the two adjacent apertures will approach the zero light fluctuation condition more than all others and thus they may both be selected and interpolation made between them. All of the remaining apertures, and consequently the photoelectric-cells associated therewith, will have substantial variable current components and therefore a substantial rectified output.

Using this minimum fluctuating current cell principle, any suitable means 12 may be devised for regulating the aperture speed to synchronize as between the speed of the aperture and the apparent motion of the objects on the ground. In brief, the regulator may simply vary the speed of the aperture until the condition of minimum rectified current is obtained for some one cell (or two cells bracketing vector TC) and then the speed of the driving means, such as motor 13, for the regulated aperture may be calibrated by means 14, such as a tachometer, to give a direct reading of the true ground speed.

While I have illustrated selector 9 as functioning by rectification, it will be understood that the invention contemplates broadly any suitable means for selecting that photoelectric-cell or cells having minimum fluctuating current component. Other and alternative means will be apparent to those skilled in the art.

Referring again to the Fig. 3, I have there shown the means providing and moving the apertures as comprising a plurality of endless tapes 15 each designed to be moved along immediately over a suitable screen or plate 16 on which the ground image may be projected, and each provided with an aperture 8. In order to provide for continuous operation, each tape 15 may be provided with a plurality of apertures 8 properly spaced so that as one aperture leaves the excursion path at the lower end a new one will appear at the top, at the same time the apertures of all tapes will preferably be phased with respect to each other such that a new aperture appears in all excursion paths of the series simultaneously immediately after the apertures of the preceding group have simultaneously disappeared.

The mechanism for moving the tapes is illustrated in greater detail in connection with the Fig. 4 to be described later and may comprise the motor 13 driving the tapes 15 over suitable end rollers 20 through flexible shaft 17 and belts 18 connected to driving reels 19 on the shaft and rollers 20.

Over each of the series of tapes 15 there is positioned the corresponding photoelectric-cell 10 arranged to receive, through the medium of a suitable optical system (see Fig. 4), the light transmitted through the aperture from the ground pattern. The output of all photoelectric-cells 10 may be supplied to the selector mechanism 9 by suitable leads as shown. The selector 9 will, of course, generate some sort of a signal indicative of the photocell corresponding to the tape aligned with the vector TC. That signal may be caused to operate the indicator mechanism 11 which may be of any suitable form such as a dial within the view of the pilot and which will inform him immediately of his true course, TC. At the same time the signal may be caused to operate the control mechanism 12 which may be any suitable means which will continuously adjust the speed of rotation of the motor 13, driving at least the selected tape or tapes at a speed which varies as the apparent ground speed varies. When the tapes are traveling in synchronism with the apparent ground speed as determined by the photocell action of the tape system aligned with the TC, the corresponding motor speed will obviously be a measure of the true ground speed of the plane and the motor may therefore be calibrated to give the pilot a direct indication of the true ground speed. Any suitable indicator 14 may be provided, for example, a tachometer having a dial mechanism within the direct view of the pilot.

Further details of the mechanism for moving the tapes 15 are illustrated by the Fig. 4. It will be there seen that the tapes are each caused to be moved along over a series of rollers 20, 21, 22 and 23; and in order to maintain a proper amount of tension in the tape the pulley 23 may be mounted on a spring arm 24. All of the tapes of the several systems are driven by the motor 13 through belts 18 and reels on the flexible shaft 17 indicated in the Fig. 3. Each of the tapes have the plurality of apertures 8 already described, each being positioned at a sufficient distance from its predecessor such that only one aperture appears on the horizontal portion of the tape at a time and also such that the apertures on all horizontal portions will move in phase with respect to each of the tapes, i. e., new apertures will simultaneously enter the horizontal portion for all tapes at the same time and the preceding ones will disappear from it simultaneously. Suitable members 25 may serve as guides for the tapes. The lenses 26 or equivalent optical systems may be employed for projecting the image transmitted through the apertures 8 on the photocell 10.

It will be necessary to take into account differences in altitude of the plane. While corrections for altitude variations may be made by appropriate adjustments of the speed of the tapes, depending on the altitude of the plane, I have preferred to accomplish the same purpose by providing the optical system 26A which is independently adjustable to compensate for any effects of altitude variation and which operates to keep the size of the ground image constant. In that case it is unnecessary to provide any special means to correct the error by variations in the tape speed. The latter optical system is shown as comprising the lens 27 which is adapted to be moved up or down depending upon the altitude requirements by the rack and gear elements 28 rotated in turn by the motor 29. The motor 29 is in turn controlled by the control element 30 which is actuated by the true altimeter 31. It will be understood that those skilled in the art will be able to devise numerous systems of this kind in which the lens system may be adjusted for some average desired altitude or normal altitude of flight and in which the altimeter will cause the control element 30 to rotate the motor one way or the other and thereby raise or lower the lens as required.

In the Fig. 5, I have shown one specific circuit which may be employed to accomplish the functions performed by the members 9, 11, 12 and 14 of the Fig. 3.

In the Fig. 5 the photoelectric-cells 10 are shown as being energized from any suitable source, such as the battery 32, each having in its circuit a resistor 33. It will be understood that there will appear across each of these resistors a voltage having a direct and an alternating component corresponding to the direct and alternating components of current induced in the corresponding photoelectric-cell by the light and the light fluctuations transmitted through the apertures 8 as already discussed. The voltages across each of these resistors 33 is applied to a corresponding series of grid controlled amplifiers 34 by being applied to their respective grids as indicated through blocking condensers 33A. The amplifier output circuits may be energized by suitable means illustrated by the battery 35 through the series of corresponding anode circuit resistors 36. To each of the output circuits of the amplifiers there is connected a coupled circuit comprising the blocking condensers 37 and resistors 38. It will be understood that the blocking condensers will remove the direct components of current and voltage in the well known manner. The remaining alternating components corresponding to the light fluctuations imposed upon the photo-cells are then caused to be rectified through the series of rectifier tubes 39, the outputs of which flow through the coils of a corresponding series of iron core inductances 40. (If necessary, direct current amplifiers may be interposed between tubes 39 and inductances 40.) The resulting direct currents in the coils of inductances 40 will cause a varying distribution of magnetic intensity in the magnetized cores 41, the variations corresponding to the magnitude of fluctuations in light in the respective photoelectric-cells.

For the purpose of selecting and indicating that cell or system which has the minimum magnetic intensity or minimum light fluctuation, the rotatable magnetized arm 42 of a suitable indicator is provided. This, as will be apparent, will rotate to align itself with the point of minimum magnetic intensity (assuming, for example, that the ends of cores 41 presented to arm 42 are all north polarized). The indicator arrow on the opposite end of arm 42 may be caused to indicate on the calibrated dial 43 the true course selected by the photoelectric-cell system.

In order to control the operation of the motor 13 in response to the circuitry just described, the following means may be provided:

The output currents flowing through the coils of inductances 40 are caused to be added together by parallel connection to the resistor 44. The voltage across this resistor will therefore be a measure of the summation of all of the fluctuating current components induced in all the photoelectric-cells. It will be apparent that under normal conditions this voltage will undergo a drop in overall magnitude at the moment when the selected aperture has become aligned both as to speed and direction with the apparent ground motion in the manner already described. This is because the fluctuation of light through that aperture, and consequently the fluctuation of current of the corresponding cell, at that moment will have dropped to zero, or substantially zero, where as at other times, when no aperture is so aligned, it, in common with the remaining cells and circuits, has substantial fluctuating current.

The voltage across the resistor 44 is applied to the grid of a grid controlled amplifier 45 and, for that reason, the mentioned drop or minimum in the voltage across resistor 44 is converted to a corresponding increase or maximum in the voltage at the anode end of the resistor 46 in the anode circuit of amplifier 45 by virtue of the well known 180° reversal of phase relationship common to amplifier action. This voltage is applied to one plate of a condenser 47 the other plate of which may be set at an appropriate potential by the potentiometer 48. The circuit interconnecting the condenser 47 and the resistor 46 includes a polarized relay 49, the action and function of which will be described presently.

The armature of the motor 13 which controls the speed of the tape may be energized by any suitable means illustrated by the battery 50, while its speed may be controlled by controlling the energization of its field winding 51 in the manner to be indicated. The field winding is energized from alternating current source 51A through the medium of the grid controlled gaseous rectifier 52 (commonly known as the thyratron). The manner of operation of gaseous rectifiers of this type is well known in the art. Its grid 53 is controlled by the charging and discharging of the condenser 54 through the battery 55 and the resistor 56. The circuit of this condenser and resistor is controlled by the armature 57 of the polarized relay 49 which may be actuated to the lower or upper position in which it is respectively connected to the contact 58, and to the contact 59 connected to the positive end of the battery 60. The tachometer, or indicator 14 is connected to the shaft of the motor 13 as indicated by the Fig. 3.

The manner of operation of the circuit just described is as follows:

The polarized relay 49 is so adjusted that armature 57 is in the lower position on contact 58 until the aforementioned increase in the voltage at the anode end of resistor 46 occurs. When power is first applied and the motor 13 is started, a charge flows through the resistor 56 to charge the condenser 54 creating initially a high positive voltage at the grid of the rectifier 52. With the resultant initial high current in the rectifier 52, the motor will start relatively slowly because of the high current in its field winding 51. As the condenser 54 charges up, the voltage across the resistor 56 and hence the current through the rectifier 52 and the field winding 51 will decrease and the motor speed will rise. The amount and limit of the increase in speed is controlled by the photo-cell circuit in the following manner:

The resulting direct components of current in the coils of inductances 40 is, as was already stated, directly proportional to the variations in light in the photoelectric-cells and these currents are summed up in the resistor 44. Remembering now that the motor speed has been constantly increasing, it will be realized that a dip or minimum in the total current in resistor 44 will be reached when the motor speed reaches a value such that the aperture in the moving tape aligned with the true course vector TC is synchronized with the apparent speed of the image of the ground. This dip, of course, will appear as a peak or maximum in the voltage at the anode end of the resistor 46 due to the mentioned 180° phase reversal. The condenser 47 will charge up following the voltage rise at the anode end of resistor 46. When the peak is passed, the voltage across the condenser 47 will exceed that at the anode end of the resistor 46 and the current through the polarized relay will reverse causing it to lift armature 57 to contact 59. This imposes a voltage on the grid 53 of the rectifier 52 sufficient to slow the motor down until the peak voltage across resistor 46 is reduced whereupon the relay 49 drops armature 57 back to contact 58 and the motor again begins to speed up. The cycle then repeats keeping the motor speed approaching very closely the correct speed. A high damped mechanical system is recommended for the motor in order to prevent "hunting."

In the Figs. 6 and 7, I have illustrated an alternative arrangement for performing the function of the tape system described in the Figs. 3 and 4. The Fig. 6 illustrates a cross section through the system while the Fig. 7 illustrates a plan view from the top omitting the optical systems and the photoelectric-cells. In the Fig. 6 I have provided a plate 61 having a series of radial slots 62 and a rotating plate 63 having a spiral slot 64. These plates perform the function of the apertures 8 and tapes 15 of the Figs. 3 and 4. That is to say, one of the slots 62 will be adapted to be aligned with the true course vector TC as was the case with the tapes in the Figs. 3 and 4, while the spiral slot 64 will form with slots 62 inwardly moving apertures 65 functioning the same as apertures 8. Plate 63 is superimprosed over plate 61 and arranged to be rotated by the motor 66 in a manner similar to the way in which the motor 13 moved the tapes 15 in 3 and 4. However, the means for providing the moving apertures discussed in connection with the Figs. 3 and 4 is slightly different. Here the apertures are provided by the alignment of the spiral slot 64 cut through the plate 63 with the respective slots 62 cut through the lower plate 61. It will be apparent therefore that as the upper plate 63 is rotated by the motor in a counterclockwise direction, apertures 65, provided by the crossing of the spiral groove with each of the radial slots 62, will appear at the periphery and these apertures will proceed continuously inwardly until they reach the inner end of slots 62 whereupon the process will be cyclically repeated by the appearance of the spiral groove again at the outer end of the radial slots 62. Photo-cell systems 10 may be provided as before to observe the fluctuations in light coming through these apertures and the same selector, indicator and control system may be employed to control the speed of the motor, etc. Likewise, the altitude correction system of Fig. 4 may again be employed as shown in Fig. 6.

Some small error may be introduced by variation of the shape of apertures 65 caused by varying angular relations between spiral slot 64 and slots 62 as the apertures 65 move inwardly, such variation causing fluctuation of the area of the selected portion of the ground image in registry with the slot. However, such variations may be minimized to the negligible point by appropriately shaping the slots in ways which will occur to those skilled in the art. For example, the error may be minimized by employing a spiral of minimum pitch such that it crosses slots 62 at angles as close to normal as possible, by minimizing the extension of the inner ends of slots 62 toward the center of rotation, and by employing plate 61 and 63 of as large a diameter as practicable.

The system of the invention may be caused to function either with the use of visible or "invisible" (infra red or other wavelengths) light, the latter being necessary where visibility is obscured by weather conditions. If invisible radiation be employed, numerous means for the adaptation of the system thereto will occur to those skilled in the art; for example, any of the numerous known devices for providing a fluorescent screen image of the ground pattern (e. g., the so called Plan Position Indicator of radar systems) may be used in conjunction with the photoelectric-cells described.

It will be apparent that my invention is equally applicable to situations wherein the measuring apparatus is associated with the relatively fixed member of the system, for example, where the apparatus described is on the ground and is observing the motion of a plane in the air.

While I have shown and described several embodiments of the invention, it will be understood that numerous possible modifications will occur to those skilled in the art. All such as fall within the true spirit and scope of the invention, I aim to include within the scope of the appended claims.

What I claim is:

1. A system for determining at least one of the parameters, speed and direction relative to a body, of an object in motion, comprising means for producing an image of said body and its apparent motion with respect to said object, a plurality of synchronizable means each movable in one of a plurality of linear directions angularly disposed with respect to each other so as to be aligned with a plurality of possible directions of said apparent motion and each synchronizable with the speed of said apparent motion, and means for determining the actual direction of said apparent motion of said image of said body including driving means for moving said plurality of synchronizable means in said plurality of directions in synchronism with the speed of said apparent motion, a device for selecting that synchronously moving means the direction of motion of which is most closely aligned with said actual direction of said apparent motion, and means interconnecting said device and driving means and responsive to selection by said device for maintaining synchronism between the speed of motion of said synchronizable means and the speed of apparent motion of said image of said body with respect to said object.

2. A system as in claim 1 including an indicator for indicating the selected means.

3. A system as in claim 1 including an indicator synchronizable with the speed of motion of said synchronizable means and calibrated to indicate the speed of motion of said object relative to said body.

4. An air navigation system for determining at least one of the parameters, speed and direction relative to the earth, of an aircraft in motion, comprising means for producing an image of the earth and its apparent motion with respect to said aircraft, a plurality of synchronizable means within said aircraft each movable in one of a plurality of linear directions angularly disposed with respect to each other so as to be aligned with a plurality of possible directions of said apparent motion and each synchronizable with the speed of said apparent motion, and means for determining the actual direction of said apparent motion of said image of the earth including driving means for moving said plurality of synchronizable means in said plurality of directions in synchronism with the speed of said apparent motion, a device for selecting that synchronously moving means the direction of motion of which is most closely aligned with said actual direction of said apparent motion, and means interconnecting said device and driving means and responsive to selection by said device for maintaining synchronism between the speed of motion of said synchronizable means and the speed of apparent motion of said image of the earth with respect to said aircraft.

5. A system as in claim 4 including an indicator for indicating the selected means.

6. A system as in claim 4 including an indicator synchronizable with the speed of motion of said synchronizable means and calibrated to indicate the speed of motion of said aircraft relative to the earth.

7. A system for determining at least one of the parameters, speed and direction relative to a body, of an object in motion comprising means defining a plurality of apertures through which an image of said body and its apparent motion with respect to said object may be viewed and each adapted to encompass within its field of view a selected portion of an image of said body, means for moving said apertures each in one of a plurality of linear directions angularly disposed with respect to each other so as to be aligned with a plurality of possible directions of said apparent motion, the motion of each aperture being synchronizable with the speed of said apparent motion, and means for determining the actual direction of said apparent motion of said image of said body including driving means for so moving said plurality of apertures in said plurality of directions in synchronism with the speed of said apparent motion, a device responsive to the intensity of light from said image passing through said apertures for selecting one or more of those of said apertures the direction of motion of which is most closely aligned with said actual direction of said apparent motion, and means interconnecting said device and driving means and responsive to selection by said device for maintaining synchronism between the speed of motion of said apertures and the speed of apparent motion of said image of said body with respect to said object.

8. A system as in claim 7 including an indicator for indicating those of said apertures.

9. A system as in claim 7 including an indicator synchronized with the speed of motion of those of said apertures and calibrated to indicate the speed of motion of said object relative to said body.

10. A system as in claim 7 wherein said device comprises a plurality of photo-responsive elements each so positioned with respect to one of said apertures as to respond to the light intensity of said selective portion of said image encompassed thereby, and means for determining those of said photo-responsive elements having the minimum current fluctuations effected by variations in the intensities of their selected image portions, and wherein said interconnecting means comprises means responsive to the latter determined photo-responsive elements for synchronizing the speed of motion of those of said apertures with the speed of apparent motion of said image of said body with respect to said object.

11. A system as in claim 10 in which said means for determining those of said photo-responsive elements having the minimum current fluctuations comprises a circuit adapted to rectify the fluctuating components of current in all said elements effected by variations in the intensities of their selected image portions, and a device for indicating that photo-responsive element having the minimum rectified current.

12. A system as in claim 7 in which said means for defining and moving said apertures comprises a plurality of elongated tapes each aligned with one of said plurality of directions and means for moving said tapes each in one of said plurality of directions.

13. A system as in claim 7 in which said means for defining and moving said apertures comprise a device defining a plurality of radial slots each aligned with one of said plurality of directions, a device defining a spiral slot juxtaposed to said radial slots, and means for rotating said latter device whereby the moving intersections of said radial and spiral slots define said apertures.

14. An air navigation system for determining at least one of the parameters, speed and direction relative to the earth, of an aircraft in motion comprising means defining a plurality of apertures through which an image of the earth and its apparent motion with respect to said aircraft may be viewed and each adapted to encompass within its field of view a selected portion of an image of the earth, means for moving said apertures each in one of a plurality of linear directions angularly disposed with respect to each other so as to be aligned with a plurality of possible directions of said apparent motion, the motion of each aperture being synchronizable with the speed of said apparent motion, and means for determining the actual direction of said apparent motion of said image of the earth including driving means for moving said plurality of apertures in said plurality of directions in synchronism with the speed of said apparent motion, a device responsive to the intensity of light from said image passing through said apertures for selecting one or more of those of said apertures the direction of motion of which is most closely aligned with said actual direction of said apparent motion, and means interconnecting said device and driving means and responsive to selection by said device for maintaining synchronism between the speed of motion of said apertures and the speed of apparent motion of said image of the earth with respect to said aircraft.

15. A system as in claim 14 including an indicator for indicating those of said apertures.

16. A system as in claim 14 including an indicator synchronized with the speed of motion of those of said apertures and calibrated to indicate the speed of motion of said aircraft relative to the earth.

17. A system as in claim 14 wherein said device comprises a plurality of photo-responsive elements each so positioned with respect to one of said apertures as to respond to the light intensity of said selective portion of said image encompassed thereby, and means for determining those of said photo-responsive elements having the minimum current fluctuations effected by variations in the intensities of their selected image portions, and wherein said interconnecting means comprises means responsive to the latter determined photo-responsive elements for synchronizing the speed of motion of those of said apertures with the speed of apparent motion of the image of the earth with respect to said aircraft.

18. A system as in claim 17 in which said means for determining those of said photo-responsive elements having the minimum current fluctuations comprises a circuit adapted to rectify the fluctuating components of current in all said elements effected by variations in the intensities of their selected image portions, and a device for indicating that photo-responsive element having the minimum rectified current.

19. A system as in claim 14 in which said means for defining and moving said apertures comprises a plurality of elongated tapes each aligned with one of said plurality of directions and means for moving said tapes each in one of said plurality of directions.

20. A system as in claim 14 in which said means for defining and moving said apertures comprises a device defining a plurality of radial slots each aligned with one of said plurality of directions, a device defining a spiral slot juxtaposed to said radial slots, and means for rotating said latter device whereby the moving intersections of said radial and spiral slots define said apertures.

DAVID SKALKA.

REFERENCES CITED

The following references are of record in the file of this patent:

UNITED STATES PATENTS

| Number | Name | Date |
|---|---|---|
| 1,385,776 | Chamberlain | July 26, 1921 |
| 1,449,387 | Fairchild | Mar. 27, 1933 |
| 1,919,126 | Perkins | July 18, 1933 |
| 2,292,153 | Olson | Aug. 4, 1942 |
| 2,350,820 | Rettinger | June 6, 1944 |
| 2,363,600 | Lawler | Nov. 28, 1944 |
| 2,370,966 | Jochum | Mar. 6, 1945 |
| 2,399,014 | Foster | Apr. 23, 1946 |
| 2,425,541 | Konet | Aug. 12, 1947 |
| 2,446,845 | Morrison | Aug. 10, 1948 |
| 2,482,795 | Philabaum | Sept. 27, 1949 |